Patented Mar. 31, 1936

2,035,510

UNITED STATES PATENT OFFICE 2,035,510

PURIFIED AMINO PHENOL SALT AND PROCESS

Serge Semenoff, Bronx, N. Y., assignor to Ostro Research Laboratories, Inc., New York, N. Y., a corporation of New Jersey No Drawing. Application April 9, 1932, Serial No. 604,357

13 Claims. (Cl. 260—130.5)

This invention relates to a method of purifying para amino phenols. It is particularly applicable to the purification of amino thymol and by it an amino thymol hydrochloride can be produced that is much more pure than any heretofore obtained.

It has long been known that para amino phenols are extremely unstable compounds and on exposure to air darken and decompose. This may be due to oxidation or to decomposition which is perhaps coupled with polymerization. It has been known for a long time that the compound itself is extremely unstable but its unstability has not been attributed to the impurities, i. e. quinones and imoquinones, which appear as by-products in the production or formation of the para amino phenols.

This instability of para amino phenols is due to strong acids and strong alkali used in the process of producing them, which probably convert amino phenols partly into quinones and imoquinones. These latter act catalytically to cause further rapid oxidation of the amino phenols and to make this reaction take place even under neutral conditions. This reaction appears to be almost impossible to control under alkaline conditions but can be checked in dilute acid solution. This is perhaps why prior attempts have been confined mostly to the preparation of only the hydrochlorides of the amino phenols.

For example, amino thymol hydrochloride has been prepared by treating thymol with nitrous acid to form nitroso thymol, (thymoquinoxime) which was later reduced with tin and hydrochloric acid. The tin double salts were then decomposed with hydrogen sulfide and the resulting hydrochloric acid solution of amino thymol was concentrated until the hydrochloride of the latter precipitated. This salt melts at 210° to 215° C. with decomposition. In prior processes in which the hydrochloride of amino thymol was isolated by concentrating its hydrochloric acid solution and allowing the resulting compound to crystallize out, the highest melting points of the salt were from 240° to 255° C.

It has become known that para amino phenols and their acid salts are extremely effective bactericides and when properly purified and prepared amino thymol and its acid salts are useful as internal antiseptics, particularly for diseases of the urinary tract. Amino thymol in the form of its hydrochloride will kill in vitro *Staphylococcus albus*, *Staphylococcus aureus* and *Streptococcus hemolyticus* in dilutions as high as 1:100,000 by contact for twenty-four hours. It will also kill *Bacillus coli*, a particularly difficult organism to destroy, in dilutions as high as 1:40,000 by contact for twenty-four hours. When properly purified, the drug may be administered in large doses over long periods of time without causing any harmful effects to the stomach or organs of the urinary tract. Rabbits tolerate doses as high as 0.5 grams per kilo of body weight administered daily over a period of three or four weeks without showing any visible irritation of the urinary tract. As ordinarily prepared, the compound is unsuitable for administration for medicinal use.

When a water solution is prepared of amino thymol hydrochloride, obtained by prior methods and having a melting point even as high as 255° C., the solution immediately exhibits a bluish color which rapidly changes to a dark blue with the final separation of an insoluble oil. Such a solution is almost entirely devoid of bactericidal action and is very objectionable for internal use as it produces a purple coloration in the organs of experimental animals to which it has been administered. This is probably due to the presence of thymoquinhydrone (a molecular compound of thymoquinone and thymohydroquinone) and a red oil (indophenol, B.16.2843) in the amino thymol hydrochloride. The presence of thymohydroquinone and thymoquinone in amino thymol hydrochloride as prepared by prior methods is believed to be unavoidable. When thymol is treated with nitrous acid nitroso thymol is formed, and thymoquinone is formed by further inter-reaction between nitrous acid and the nitroso thymol. The thymoquinone can be isolated and identified in the nitroso thymol. This substance is converted into thymohydroquinone by the action of the reducing agents used in the prior processes. The thymohydroquinone is partially converted again into thymoquinone in the presence of amino thymol by the action of concentrated hydrochloric acid that has been invariably used heretofore in the prior processes. This thymoquinone is precipitated along with amino thymol hydrochloride and acts on the latter to form more thymoquinone and is itself converted to thymohydroquinone with the result that a purple dye, thymoquinhydrone (i. e., a reaction product of thymoquinone and thymohydroquinone), and a red oil are formed. In this way the amino thymol is quite rapidly converted into a substance that is therapeutically useless.

I have discovered that amino thymol is readily soluble in an acid solution having a pH between 1.5 and 2.5, while the above impurities, i. e., the red oil, thymoquinone and thymoquinhydrone, are insoluble. These substances may therefore be removed sometimes from the acid solution simply by filtering the solution through an effective medium such as felt or asbestos. However, these impurities often form a colloidal emulsion and in this condition pass through the filter. The emulsion can be broken occasionally by boiling, but usually the most successful method of removing these impurities is to extract them with a solvent such as ether or chloroform. The amino thymol hydrochloride is insoluble in the latter. Whatever method is used for extracting these insoluble impurities, the final solution should be water white and clear, with no opalescence which would indicate the presence of such an impurity. After the impurities have been removed the acid concentration is brought up about 6 to 15% whereupon the acid salt of amino thymol will be precipitated in a pure form. Care must be taken not to let the acid concentration increase much beyond this amount as this would be in danger of causing the formation of thymoquinone. However, at the above mentioned acid concentrations the formation of thymoquinone does not take place or is sufficiently slow to allow the acid salt to be filtered off and dried in a very pure condition.

In carrying out this invention I prefer to dissolve the amino thymol in a dilute hydrochloric acid solution of pH 1.5 to 2.5, and then filter or otherwise treat as above described to extract or remove thymoquinone, thymoquinhydrone and the red oil already formed and thereafter concentrate the solution, preferably by the addition of concentrated hydrochloric acid, up to from 6 to 15%. Thereupon the amino thymol hydrochloride is precipitated in the form of pure white needle like crystals of a silky lustre. These can be readily separated from the mother liquor by filtration, and are then preferably washed with 10% hydrochloric acid, and dried. As distinguished from the amino thymol heretofore known this amino thymol has a melting point of from 265 to 268° C. and shows no decomposition at this temperature. When it is dissolved in water it forms a perfectly clear colorless solution which in the absence of oxygen remains colorless for several weeks. On the contrary, amino thymol hydrochloride prepared in accordance with prior processes makes a violet solution in water which turns deeper violet on standing and forms an insoluble oil which floats on the surface of the solution. The crystalline or powdered product may be formed into tablets by using the usual binders for this purpose.

When the amino thymol purified in accordance with this invention is administered orally it is eliminated almost completely in the urine in two to six hours in a form which is still actively bactericidal. On administration to patients suffering from infections of the urinary tract, particularly of the pelvis of the kidney and bladder, such as pyelitis and cystitis there is in a few days a diminution in the number of colonies of bacteria which can be cultivated from the eliminated urine whether the bacteria are of the gram positive or gram negative variety. This is a considerable improvement over any present known method of treatment of these diseases.

Modifications of the method described above for purifying the amino thymol will occur to those skilled in the art by which substantially the same results can be accomplished. For example, the impure amino thymol may be dissolved in dilute acetic or sulfurous acid, the impurities filtered or extracted from the solution if necessary and the hydrochloride then precipitated from the filtered solution by the addition of sodium chloride. The crystals may then be washed with 10% hydrochloric acid.

While in describing my method of obtaining a pure para amino phenol I have shown as an example amino thymol, nevertheless what has been said of the reactions, color changes, and solubilities are also true of the family of para amino phenols in general and my invention is equally applicable to them. For example, para amino derivatives of carvacrol, xylenol, cresol, phenol, diethyl phenol, etc. all form the corresponding quinones, hydroquinones, quinhydrones and purple dyes under the same conditions and can be freed from these impurities in the same way.

I claim:

1. The process of removing from an amino phenol impurities resulting from decomposition of said amino phenol, which comprises dissolving the impure amino phenol in dilute non-oxidizing acid at a pH between about 1.5 and about 2.5, extracting insoluble decomposition impurities, and recovering the purified amino phenol in the form of a salt by concentrating the solution.

2. The process of removing from an amino phenol impurities resulting from decomposition of said amino phenol, which comprises dissolving the impure amino phenol in dilute non-oxidizing acid at a pH between about 1.5 and about 2.5, extracting insoluble decomposition impurities and recovering the purified amino phenol in the form of a salt by increasing the acid strength to about 6% to about 15%.

3. The process of removing from an amino phenol impurities resulting from decomposition of said amino phenol, which comprises dissolving said amino phenol in dilute non-oxidizing acid at a pH between about 1.5 and about 2.5, removing decomposition impurities and recovering the amino phenol salt by increasing the concentration of negative ions corresponding to those of the acid sufficiently to cause precipitation of the amino phenol salt of the acid used.

4. The process of producing an amino phenol hydrochloride free from impurities resulting from decomposition of the amino phenol, which comprises dissolving said amino phenol in dilute hydrochloric acid at a pH between about 1.5 and about 2.5, extracting decomposition impurities with an organic solvent and recovering amino phenol hydrochloride by increasing the concentration of chlorine ions sufficiently to cause precipitation of the amino phenol hydrochloride.

5. The process of removing from a para amino phenol impurities resulting from decomposition of said para amino phenol, which comprises dissolving a para amino phenol in dilute non-oxidizing acid at a pH between about 1.5 and about 2.5, extracting insoluble decomposition impurities, and recovering a purified para amino phenol in the form of a salt by concentrating the solution.

6. The process of producing a para amino phenol hydrochloride free from impurities resulting from decomposition of said para amino phenol, which comprises dissolving a para amino phenol containing such impurities in dilute hydrochloric acid at a pH between about 1.5 and about 2.5, removing insoluble impurities and recovering the para amino phenol salt by increasing the concentration of Cl ions sufficiently to cause precipitation of the hydrochloride.

7. The process of removing from para amino thymol impurities resulting from decomposition of said amino thymol, which comprises dissolving amino thymol in dilute non-oxidizing acid at a pH between about 1.5 and about 2.5, extracting insoluble decomposition impurities, and recovering the purified amino thymol in the form of a salt by concentrating the solution.

8. The process of removing from an amino thymol impurities resulting from decomposition of said amino thymol, which comprises dissolving said amino thymol in dilute non-oxidizing acid at a pH between about 1.5 and about 2.5, extracting insoluble decomposition impurities, and recovering the purified amino thymol in the form of a salt by increasing the acid strength of the solution to about 6% to about 15%.

9. The process of removing from para amino thymol impurities resulting from decomposition of said amino thymol, which comprises dissolving said amino thymol in dilute non-oxidizing acid at a pH between about 1.5 and about 2.5, removing decomposition impurities, and recovering amino thymol salt by increasing the concentration of negative ions corresponding to those of the acid sufficiently to cause precipitation of the amino thymol salt.

10. The process of producing para amino thymol hydrochloride free from impurities resulting from oxidation of amino thymol, which comprises dissolving amino thymol in dilute hydrochloric acid at a pH between about 1.5 and about 2.5, extracting oxidation impurities with an organic solvent and recovering amino thymol hydrochloride by increasing the concentration of chlorine ions sufficiently to cause precipitation of the amino thymol hydrochloride.

11. The process of producing para amino thymol hydrochloride free from impurities resulting from oxidation of amino thymol which comprises dissolving amino thymol in hydrochloric acid at a pH between about 1.5 and about 2.5, removing said impurities and recovering amino thymol hydrochloride by the introduction of chlorine ions in concentration sufficient to cause precipitation of the amino thymol hydrochloride.

12. The process of producing para amino thymol hydrochloride free from impurities resulting from oxidation of amino thymol which comprises dissolving amino thymol in dilute hydrochloric acid at pH between about 1.5 and about 2.5, extracting said impurities and recovering para amino thymol hydrochloride by increasing the concentration of chlorine ions sufficient to cause precipitation of the amino thymol hydrochloride.

13. The process of producing para amino thymol hydrochloride free from impurities resulting from oxidation of amino thymol, which comprises dissolving amino thymol in dilute hydrochloric acid at a pH between about 1.5 and about 2.5, extracting said impurities with ether and recovering para amino thymol hydrochloride by increasing the acid concentration to from about 6 to about 15 per cent.

SERGE SEMENOFF.